(12) United States Patent
Dossenback

(10) Patent No.: US 6,539,897 B1
(45) Date of Patent: Apr. 1, 2003

(54) DOUBLE LEAD LEASH CONSTRUCTION

(76) Inventor: Stephen C. Dossenback, 1333 Burnham Dr., Columbus, OH (US) 43228

( * ) Notice: Subject to any disclaimer, the term of this patent is extended or adjusted under 35 U.S.C. 154(b) by 0 days.

(21) Appl. No.: 09/976,354

(22) Filed: Oct. 12, 2001

(51) Int. Cl.⁷ .............................................. A01K 27/00
(52) U.S. Cl. ...................... 119/795; 119/797; 119/799
(58) Field of Search ........................ 119/796–799, 795, 119/109; D29/101.1; D30/134; 54/34

(56) References Cited

U.S. PATENT DOCUMENTS

| | | | |
|---|---|---|---|
| 4,879,972 A | 11/1989 | Crowe et al. ................ | 119/109 |
| 4,892,063 A | 1/1990 | Garrigan ..................... | 119/109 |
| 4,958,597 A * | 9/1990 | Mildner ...................... | 119/771 |
| D337,396 S | 7/1993 | Werner ....................... | D30/153 |
| 5,483,925 A * | 1/1996 | Childress .................... | 119/795 |
| 5,632,234 A | 5/1997 | Parker ........................ | 119/795 |
| 5,701,848 A * | 12/1997 | Tozawa ...................... | 119/795 |
| 5,852,988 A | 12/1998 | Gish .......................... | 119/795 |
| 5,901,668 A | 5/1999 | Goodger, Sr. ............... | 119/795 |
| 6,006,699 A * | 12/1999 | Keever ....................... | 119/795 |
| 6,237,539 B1 * | 5/2001 | Sporn ......................... | 119/771 |
| 6,247,428 B1 * | 6/2001 | Mireles ...................... | 119/771 |

* cited by examiner

*Primary Examiner*—Peter M. Poon
*Assistant Examiner*—Susan Piascik
(74) *Attorney, Agent, or Firm*—Henderson & Sturm LLP

(57) ABSTRACT

A double lead leash construction (10) including a pair of generally elongated lead members (20), (20') having looped distal ends (21) engaging a respective pair of snap swivels (22), (22'). The proximal ends of the lead members (20), (20') are joined together as at (23). A rigid support arm (30) connected on its opposite ends to opposed surfaces of the lead members (20), (20') proximate to, but spaced from the juncture (23) of the lead members (20), (20') and a generally rigid main shaft member (60) having a distal end attached to the juncture (23) of the lead members (20), (20') and a looped proximal end (61) that captively engages a double swivel element (62) that is adapted to be attached to a conventional control handle unit (14), (14') to prevent the entanglement of the pair of lead members (20), (20') while walking a pair of animals.

6 Claims, 1 Drawing Sheet

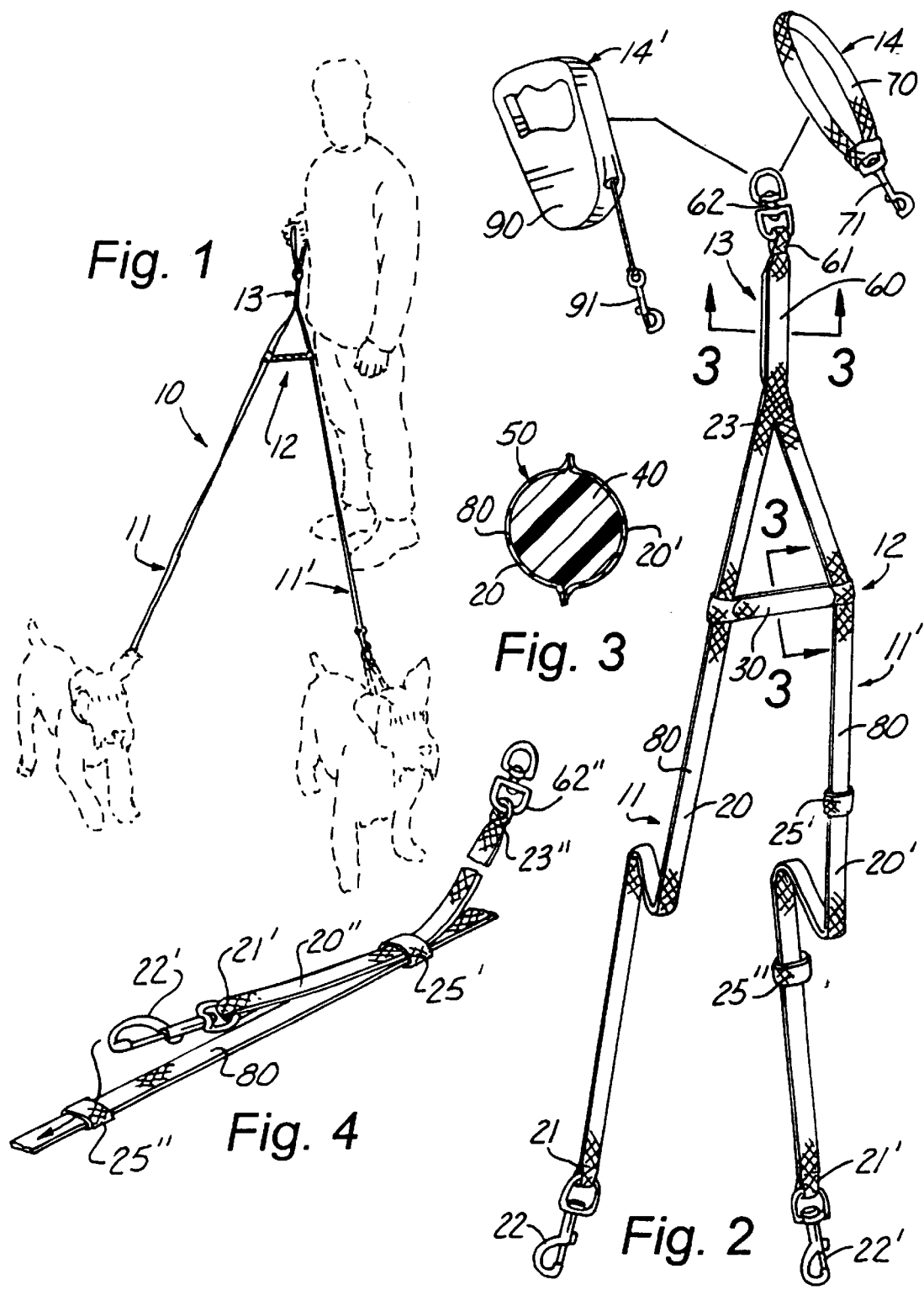

DOUBLE LEAD LEASH CONSTRUCTION

BACKGROUND OF THE INVENTION

1. Field of the Invention

The present invention relates to the field of pet restraints in general, and in particular to a new type of double lead leash construction for walking a pair of dogs.

2. Description of Related Art

As can be seen by reference to the following U.S. Pat. Nos. 5,632,234; 4,879,972; 5,852,988; and 5,901,668, the prior art is replete with myriad and diverse double lead leash constructions.

While all of the aforementioned prior art constructions are more than adequate for the basic purpose and function for which they have been specifically designed, they are uniformly deficient with respect to their failure to provide a simple, efficient, and practical leash arrangement that allows two dogs to be walked or exercised at the same time without the leads becoming tangled with one another.

As anyone who owns a pair of dogs is all too painfully aware, the act of walking two dogs at the same time can become a bothersome chore due to the tendency of the dogs to cross over each others line of travel, resulting in the dog owner constantly having to untangle the leads.

As a consequence of the foregoing situation, there has existed a longstanding need for a new and improved double lead leash construction that virtually eliminates the lead tangling problem encountered with other double lead leash arrangements, and the provision of such an arrangement is the stated objective of the present invention.

BRIEF SUMMARY OF THE INVENTION

Briefly stated, the double lead leash construction that forms the basis of the present invention comprises in general, a pair of lead units operatively connected both to one another, as well as to a spreader unit and a central shaft unit which is adapted to be connected to a variety of conventional control units.

As will be explained in greater detail further on in the specification, both the spreader unit and the central shaft unit form the heart of this invention and comprise general rigid structural members that allow the flexible lead units to rotate relative to a selected conventional handle control unit in a controlled swiveling fashion that effectively prevents the lead units from becoming tangled up with one another.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the double lead leash construction that forms the basis of this invention in use;

FIG. 2 is an isolated perspective view of the double lead leash construction;

FIG. 3 is a typical cross sectional view of the spreader unit and the main shaft unit taken through lines 3—3 of FIG. 2; and FIG. 4 is an isolated detail view of an optional auxiliary lead lengthening arrangement contemplated for use with at least one of the lead units.

DETAILED DESCRIPTION OF THE INVENTION

As can be seen by reference to the drawings, and in particular to FIGS. 1 and 2, the double lead leash construction that forms the basis of the present invention is designated generally by the reference number 10. The construction 10 comprises in general, a pair of lead units 11, 11', a spreader unit 12, and a main shaft unit 13 adapted for use with a selected conventional handle control unit 14, 14'. These units will now be described in seriatim fashion.

As can best be seen by reference to FIG. 2, each of the lead units 11, 11' are virtually identical in construction and comprise an elongated generally flexible lead member 20, 20' having looped distal ends 21, 21' provided with conventional snap swivels 22, 22' that are adapted to engage a conventional dog collar in a well recognized fashion and having proximal ends which are connected to one another as at 23.

As shown in FIGS. 2 and 3, the spreader unit 12 comprises a generally rigid spreader arm member 30 operatively connected to both of the lead members 20, 20' at a location disposed proximate to, but spaced from the juncture 23 of the distal ends of the lead members 20, 20'.

As was mentioned previously, FIG. 3 is a representational view of a cross section of both the spreader unit 12 and the main shaft unit 13. Like reference numerals will be used to identify similar structural components of both the spreader unit 12 and the main shaft unit 13.

Essentially, both of these units comprise a rigid bar 40 surrounded by a fabric envelope 50. In the case of the spreader arm member 30, the opposite ends of the fabric envelope 50 are secured to each of the flexible lead members 20, 20'.

The main shaft unit 13 comprises a generally rigid shaft member 60 having a loop element 61 formed on its proximal end which is further provided with a double swivel element 62 whose purpose and function will be described in greater detail later on in the specification.

At this juncture, it should be noted that in the preferred embodiment of this invention, the fabric envelope 50 that surrounds the rigid bar 40 of the rigid shaft member 60 comprises an extension of the flexible material that comprises each of the lead members 20, 20'. A single elongated strip of leash fabric designated generally as 80 forms both of the lead members 20, 20', as well as the loop 61 and the fabric envelope 50 of the main shaft member 60. The flexible material 80 is fastened together to form the loop 61 and the juncture 23 of the lead members 20, 20'.

Returning once more to FIG. 2, it can be seen that the conventional handle control units 14, 14' that are intended for use with the double lead leash construction 10 include a first conventional fixed length handle member 70 equipped with a snap swivel 71 and a second conventional extensible and retractable handle member 90 likewise provided with a snap swivel 91. Both of the snap swivels 71 and 91 are adapted to releasably engage the double swivel element 62 on the proximal end of the main shaft member 60.

As can best be appreciated by reference to FIG. 4, this invention also contemplates an auxiliary lead lengthening arrangement wherein at least one of the lead members 20' is provided with a pair of elasticized loops 25' 25" which are adapted to receive an auxiliary lead 20" having a snap swivel 22" provided on its distal end 21" and a double swivel 62" provided on its proximal end 23".

As most pet owners are aware, there are many instances when either the size of the pets or the normal gait of the individual pet dictates that one animal should be on a longer lead for the express purpose of reducing the possibility that the primary lead members 20 20' will become entangled with one another.

In an effort to solve that problem, this invention contemplates the carrying of an auxiliary lead 20" that can be attached to the end of either one of the primary leads 20 20' to increase the effective length of the chosen primary lead 20 or 20' in a well recognized fashion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A double lead leash construction adapted to be engaged by a selected one of a plurality of conventional control members including a fixed length handle member having a snap swivel and an adjustable length handle member having a snap swivel and a pair of pet collars wherein the constructions comprises:

a pair of lead units wherein each lead unit includes an elongated generally flexible lead, member having a proximal end and a looped distal end provided with a snap swivel wherein the proximal ends of the lead members are connected to one another;

a main shaft unit including a rigid main shaft member; wherein the rigid main shaft member is a rigid bar surrounded by a fabric envelope, having a distal end integrally connected to the proximal end of both lead members; and a rigid spreader arm member for maintaining opposed portions of the lead members at a fixed distance relative to one another; wherein the spreader arm is a rigid bar surrounded by a fabric envelope, having opposite ends integrally connected to respective lead members.

2. The construction as in claim 1 wherein at least one of the lead members is provided with means for adjusting the effective length of said at least one lead member.

3. The construction as in claim 1 wherein the proximal end of the main shaft member is provided with a loop element connected to a double swivel element that is adapted to be engaged with the snap swivel on one of the conventional control members.

4. The construction as in claim 2 wherein the proximal end of the main shaft member is provided with a loop element connected to a double swivel element that is adapted to be engaged with the snap swivel on one of the conventional control members.

5. A method of fabricating a double lead leash construction comprising the following steps:

(a) taking an elongated strip of leash material having a midpoint and opposite ends and threading one end of the strip of leash material through one end of a double swivel element to position the double swivel element at the midpoint of the strip of leash material;

(b) joining opposed surfaces of the strip of leash material together proximate the midpoint to captively engage the double swivel element relative to the strip of leash material;

(c) threading the opposed ends of the strip of leash material through a respective pair of snap swivels and forming a fixed loop on each end of the strip of leash material to captively engage the snap swivels on the opposite ends of the strip of leash material;

(d) placing a rigid bar between opposed surfaces of the strip of leash material adjacent to the double swivel element and joining the opposed surfaces to form a fabric envelope that surrounds said rigid bar; and, (e) placing a rigid support arm having opposite ends between opposed surfaces of the strip of leash material at a location proximate to, but spaced from, the midpoint of the strip of leash material and fixedly connecting the opposite ends of the rigid support arm to the opposed surfaces of the strip of leash material.

6. The method as in claim 5 wherein steps (d) and (e) occur in reverse order.

\* \* \* \* \*